US010609855B2

(12) United States Patent
Dienst et al.

(10) Patent No.: US 10,609,855 B2
(45) Date of Patent: Apr. 7, 2020

(54) MAGNETIC MARKER ARM RETENTION

(71) Applicant: CNH Industrial America LLC, New Holland, PA (US)

(72) Inventors: Johnathon R. Dienst, DeKalb, IL (US); Patrick Dinnon, Plainfield, IL (US); Michael J. Connors, Lockport, IL (US); Brent Elwing, Roselle, IL (US); Brian J. Anderson, Yorkville, IL (US); Chad M. Johnson, Arlington Heights, IL (US); Travis L. Harnetiaux, Bourbonnais, IL (US)

(73) Assignee: CNH Industrial America LLC, New Holland, PA (US)

(*) Notice: Subject to any disclaimer, the term of this patent is extended or adjusted under 35 U.S.C. 154(b) by 3 days.

(21) Appl. No.: 16/018,874

(22) Filed: Jun. 26, 2018

(65) Prior Publication Data

US 2019/0387657 A1 Dec. 26, 2019

(51) Int. Cl.
| A01B 69/02 | (2006.01) |
| A01B 73/04 | (2006.01) |
| A01B 15/14 | (2006.01) |
| A01B 63/24 | (2006.01) |
| A01B 35/16 | (2006.01) |
| A01C 7/08 | (2006.01) |

(52) U.S. Cl.
CPC ............ *A01B 73/046* (2013.01); *A01B 15/14* (2013.01); *A01B 35/16* (2013.01); *A01B 63/245* (2013.01); *A01B 69/024* (2013.01); *A01C 7/08* (2013.01)

(58) Field of Classification Search
CPC ............ A01B 73/00–067; A01B 69/02; A01B 69/024
See application file for complete search history.

(56) References Cited

U.S. PATENT DOCUMENTS

| 2,673,111 A | 3/1954 | Teetor |
| 3,110,516 A | 11/1963 | Sukala, Jr. |
| 3,578,370 A | 5/1971 | Greytok |
| 4,561,505 A * | 12/1985 | Williamson ......... A01B 73/044 16/242 |
| 4,867,245 A * | 9/1989 | Stevens ............... A01B 73/046 172/311 |
| 5,370,430 A | 12/1994 | Mozafari |
| 6,019,178 A * | 2/2000 | Redekop ............... A01B 61/04 172/126 |

(Continued)

FOREIGN PATENT DOCUMENTS

| CN | 105419021 A | 3/2016 |
| GB | 810534 A | 3/1959 |
| GB | 987200 A | 3/1965 |

OTHER PUBLICATIONS

Machine translation of CN105419021A.

*Primary Examiner* — Matthew Troutman
(74) *Attorney, Agent, or Firm* — Rebecca L. Henkel; Rickard K. DeMille

(57) ABSTRACT

An implement for an agricultural vehicle including a toolbar and a pair of marking devices pivotally connected to the toolbar. Each marking device includes at least one arm configured for pivoting between a stored position and an operational position, and a retention device supported by the toolbar and configured for providing a magnetic retention force which magnetically retains the at least one arm in the stored position.

14 Claims, 2 Drawing Sheets

(56) References Cited

U.S. PATENT DOCUMENTS

| | | | |
|---|---|---|---|
| 6,367,562 B1 * | 4/2002 | Mosdal | A01B 73/046 172/311 |
| 7,467,668 B2 * | 12/2008 | Kimball | A01B 73/044 172/311 |
| 7,690,974 B2 | 4/2010 | Johnson | |
| 7,815,232 B2 | 10/2010 | Henry et al. | |
| 8,016,043 B2 * | 9/2011 | Naylor | A01B 69/024 172/126 |
| 8,747,045 B2 | 6/2014 | Belik | |
| 9,190,198 B2 | 11/2015 | McBroom et al. | |
| 2002/0043813 A1 | 4/2002 | McManus et al. | |
| 2006/0225900 A1 * | 10/2006 | Kimball | A01B 73/044 172/311 |
| 2009/0020298 A1 * | 1/2009 | Harnetiaux | A01B 69/024 172/1 |
| 2009/0101373 A1 * | 4/2009 | Kimball | A01B 73/044 172/311 |
| 2010/0116955 A1 | 5/2010 | Hayes et al. | |

* cited by examiner

MAGNETIC MARKER ARM RETENTION

FIELD OF THE INVENTION

The present invention pertains to implements for an agricultural vehicle and, more specifically, to implements having marker arms.

BACKGROUND OF THE INVENTION

Agricultural planters are commonly used implements to plant seeds in soil. An agricultural planter can include a chassis that carries seed and/or chemical storage tanks, a hitch mechanism that attaches to a tractor or other implement pulled by a tractor, a toolbar, and row units attached to the toolbar. The planter can also include a pneumatic system carried by the chassis that supplies pressurized air to transport the seeds or other particulate from the storage tanks to the row units. The planter may additionally include marking devices in the form of a marking disc and one or more marker arm(s) connected to the lateral ends of the toolbar. The marking devices can be automatically and individually raised and lowered by a respective lift assembly, such as a hydraulic cylinder. The marking devices create a line, e.g. a furrow, in the field which illustrates a marker of the position of the planter as it traverses the field. This marker can be used by the operator to more easily align the planter during subsequent passes down the field. Thereby, the operator can properly align the planter so that the planter does not reseed an area or create a gap between a previously planted row and a new row. The marker arms of the marking devices can be folded into a stored position in which the arms rest on top of the toolbar or unfolded into an operational position in which the marking devices can mark a line in the field.

Generally, the outer marker arms have the ability to swing freely in the stored position. Thereby, the outer marker arms can become unfolded when the planter undergoes certain movements, for example, when the planter tilts up and down or side-to-side, performs fast end-of-field turns, and/or suddenly stops. If the outer marker arms undesirably unfold out of their respective stored positions, the outer marker arms may hit and damage another structure, such as the seed tanks, chemical tanks, trees, etc. Still further, the undesirable unfolding of the outer marker arms can result in damage to the outer marker arms themselves.

What is needed in the art is a cost-effective device to secure the marker arms in their respective stored positions.

SUMMARY OF THE INVENTION

In one exemplary embodiment formed in accordance with the present invention, there is provided an agricultural planting implement that includes a pair of marking devices which have respective retention devices for holding the outer arms in their stored positions such that the outer arms do not undesirably unfold without actuation of their respective actuators. Each retention device includes a flexible mount, a magnetic element mounted to the flexible mount, and a bumper for supporting the weight of the outer arm. The magnetic element magnetically retains the outer arm and the flexible mount dampens the impact of the outer arm acting upon the magnetic element. In another exemplary embodiment, the bumper may include a magnetic element for magnetically retaining the outer arm. The magnetically equipped bumper may take the place of or operate in conjunction with the flexible mount and its magnetic element.

In another exemplary embodiment formed in accordance with the present invention, there is provided an implement for an agricultural vehicle including a toolbar and a pair of marking devices pivotally connected to the toolbar. Each marking device includes at least one arm configured for pivoting between a stored position and an operational position, and a retention device supported by the toolbar and configured for providing a magnetic retention force which magnetically retains the at least one arm in the stored position.

In yet another exemplary embodiment formed in accordance with the present invention, there is provided a marking device pivotally connected to an implement of an agricultural vehicle. The marking device includes a first arm and a second arm pivotally connected to the first arm. The first and second arms are configured for pivoting between a stored position in which the first and second arms are folded relative to one another and an operational position in which the first and second arms are unfolded relative to one another. The marking device also includes a retention device connected to the second arm and configured for retaining the first arm relative to the second arm in the stored position.

In another exemplary embodiment formed in accordance with the present invention, there is provided an implement for an agricultural vehicle including a toolbar and a pair of marking devices pivotally connected to the toolbar. Each marking device includes a first arm and a second arm pivotally connected to the first arm. The first and second arms are configured for pivoting between a stored position in which the first and second arms are folded relative to one another and an operational position in which the first and second arms are unfolded relative to one another. Each marking device also includes a retention device which includes a bumper connected to the second arm and having at least one recess and at least one magnetic element disposed within the at least one recess of the bumper. The bumper is configured for supporting a weight of the first arm in the stored position, and the at least one magnetic element is configured for providing a magnetic retention force which magnetically retains the first arm relative to the second arm in the stored position.

One possible advantage of the exemplary embodiment of the agricultural implement is that the marking devices do not undesirably unfold out of the stored position, and thereby any damage which would have been caused by the outer arm contacting the various tanks and components of the agricultural implement are prevented.

BRIEF DESCRIPTION OF THE DRAWINGS

For the purpose of illustration, there are shown in the drawings certain embodiments of the present invention. It should be understood, however, that the invention is not limited to the precise arrangements, dimensions, and instruments shown Like numerals indicate like elements throughout the drawings. In the drawings.

DETAILED DESCRIPTION OF THE INVENTION

Figure 1:
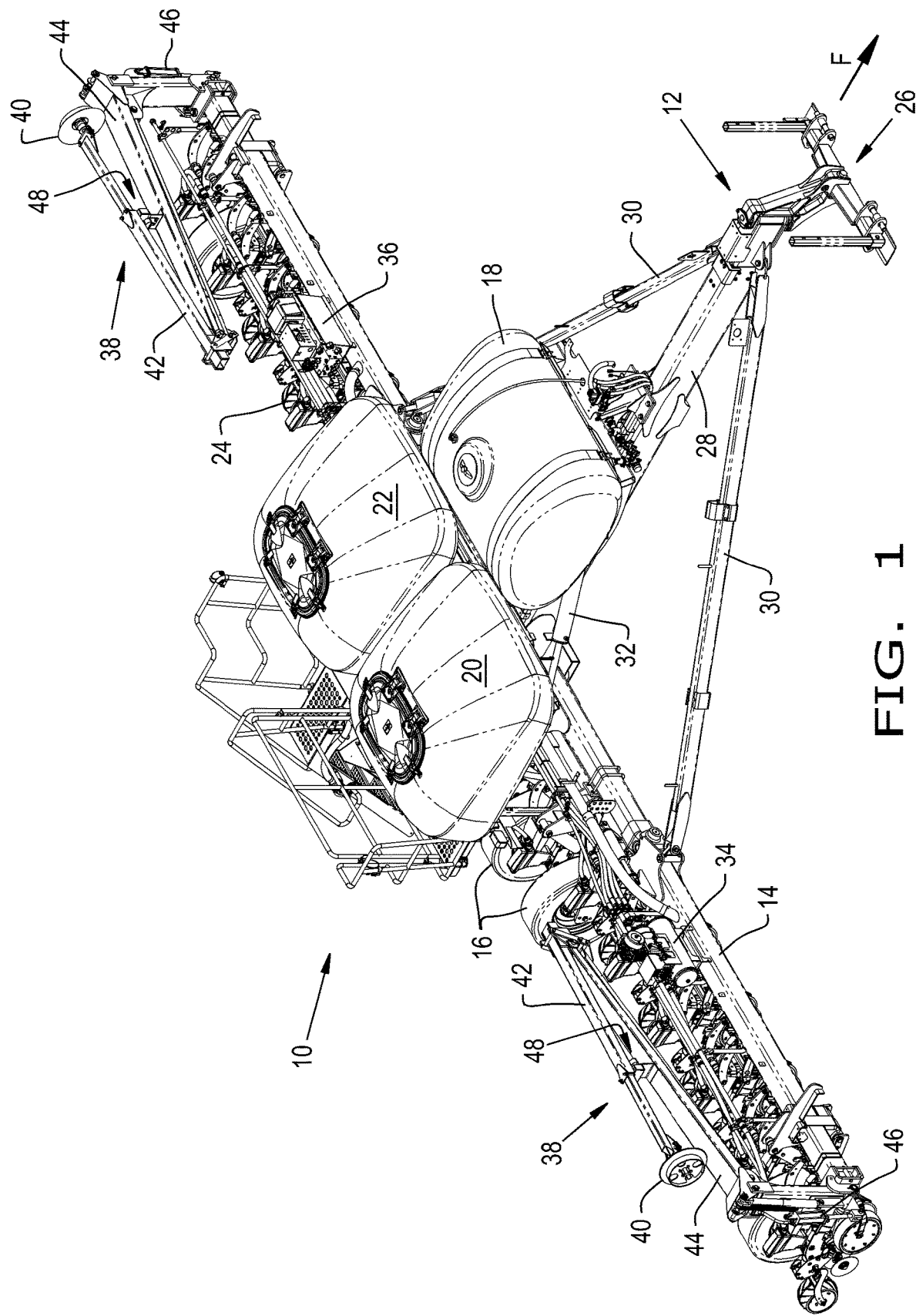
FIG. 1 illustrates a perspective view of an exemplary embodiment of a planter, the planter including a pair of marking devices each having a retention device, in accordance with an exemplary embodiment of the present invention.

Referring now to the drawings, and more particularly to FIG. 1, there is shown an exemplary embodiment of an agricultural implement 10, shown in the form of a planter 10, formed in accordance with the present invention. The planter 10 may be connected to an agricultural vehicle, for example a tractor, or another implement pulled by the agricultural vehicle. The planter 10 generally includes a hitch assembly 12 at a front of the planter 10, a toolbar 14, main wheels 16, one or more storage tanks 18, 20, 22 that can be filled with seed or other agriculture material, such as fertilizer, and a plurality of row units 24 connected to the toolbar 14 and arranged laterally across the length of the toolbar 14. The hitch assembly 12 can include a hitch 26 which is configured for connecting to the tractor or other agricultural implement so that the planter 10 can be pulled in a forward direction "F". The hitch 26 can be integrally formed with or connected to a center frame 28 that is connected to the toolbar 14 by bracing bars 30 and one or more actuators 32. The planter 10 can also have various hydraulic, pneumatic, and electrical lines (unnumbered) throughout in order to support various cylinders and systems that are included on the planter 10, such as a pneumatic system 34 connected to the toolbar 14 and an electric generator 36 which is also connected to the toolbar 14. Additionally, the planter 10 may also include at least one marking device 38, for example, a pair of marking devices 38 that are moveably connected to each lateral end of the toolbar 14. It should also be appreciated that the agricultural implement 10 may be in the form of any desired agricultural implement 10 such that the marking devices 38 may be incorporated as part of any desired agricultural implement 10.

Figure 2:
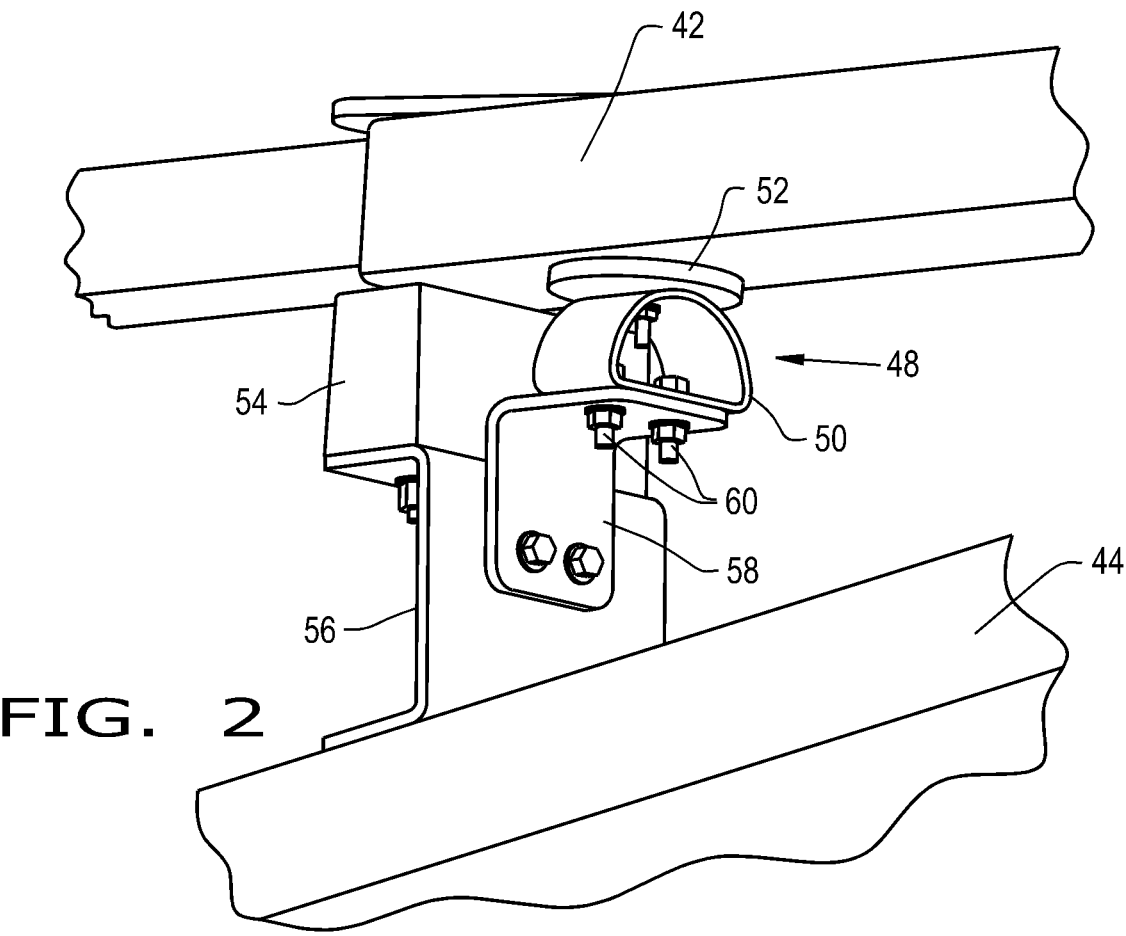
FIG. 2 illustrates the retention device of a marking device of the planter of FIG. 1, in accordance with an exemplary embodiment of the present invention.

Referring now collectively to FIGS. 1-2, there is shown the marking devices 38 of the planter 10. The marking devices 38 can create a line in the soil as the planter 10 is pulled in the forward direction F in order to help a user position the planter 10 for creating subsequent rows. Also, a respective marking device 38 marks a line at the next center line as the planter 10 turns around for the next pass. Each marking device 38 generally includes a marking disc 40 and one or more folding marker arm(s) 42, 44. As shown, each marking device 38 includes a first, outer arm 42 which rotationally connects to the disc 40 and a second, inner arm 44 pivotally connected to the outer arm 42 and supported by the toolbar 14. The inner arm 44 is configured for pivotally connecting to the planter 10 whereby the inner arm 44 can be pivotally connected to an extension arm (unnumbered) which in turn is coupled to the toolbar 14. The marking devices 38 may be automatically and individually folded into and out of a folded, stored position and an unfolded, operational position via one or more actuators 46, e.g. hydraulic or pneumatic cylinders, that are respectively associated with each marking device 38. The actuators 46 are supported by the toolbar 14 and they may operate to extend and retract in order to respectively fold and unfold the arms 42, 44 in a known manner. The arms 42, 44 may be composed of any desired material such as a ferrous metal, e.g. steel.

Further, each marking device 38 may also include a respective retention device 48 for retaining the arms 42, 44 in the folded, stored position. The retention device 48 generally includes a deformable mount 50, one or more magnetic element(s) 52 mounted to the deformable mount 50, and a bumper 54. The retention device 48 may also include a first bracket 56 connected to the inner arm 44 and mounting the bumper 54 and a second bracket 58 which is connected to the first bracket 56 and mounts the deformable mount 50. Hence, the retention devices 48 are mounted to the inner arms 44 by the first brackets 56, and when the marking devices 38 are in the folded, stored position the retention devices 48 are located in between the topside of the inner arms 44 and the bottom-side of the outer arms 42. Due to the magnetic retention force provided by each magnetic element 52, the retention devices 48 retain or otherwise hold the outer arms 42 in their folded positions relative to the inner arms 44. In this way, when the planter 10 experiences an abrupt movement or is tilted the marking devices 38 remain in their stored positions.

The deformable mount 50 mounts the magnetic element 52 and is connected to the bracket 58. The deformable mount 50 may deform or flex slightly such that the deformable mount may compress under the weight of a respective outer arm 42 and/or expand when the respective outer arm 42 begins to unfold or has already unfolded from the inner arm 44. In this regard, the deformable mount 50 can dampen the impact of the outer arm 42 as it folds and acts upon the magnetic element 52. The deformable mount 50 may also provide flexibility due to part misalignment and/or manufacturing variances. The deformable mount 50 may be in the form of a flexible belt 50 with a semi-circular cross-section. The deformable mount 50 may be composed of a semi-deformable or flexible material such as a polymer material, a rubber material, and/or a composite. For instance, the deformable mount 50 may be in the form of a flexible rubber belt 50. The deformable mount 50 can be affixed to the bracket 58 by way of an adhesive and/or known fasteners 60, such as screws or bolts and nuts.

The magnetic element(s) 52 may be configured to provide a magnetic retention force which magnetically retains the outer arm 42 in the folded, stored position. As shown, each retention device 48 includes one magnetic element 52 which is connected to the deformable mount 50. When the outer arms 42 are folded, the material of the outer arms 42, e.g. a ferrous metal, is magnetically gripped by the respective magnetic fields of the magnetic elements 52. The magnetic elements may directly contact the outer arms 42, as shown in FIG. 2, or the magnetic elements may not directly contact the outer arms 42. The magnetic elements 52 inhibit the movement of the outer arms 42 such that the outer arms 42 are prevented from undesirably unfolding upon being tilted, jostled, or subjected to an abrupt force and/or an inertial force. Yet, the magnetic retention forces of the magnetic elements 52 will not prevent the outer arms 42 from unfolding when the actuators 46 are actuated automatically or by an operator. In other words, the unfolding forces applied by the actuators 46 are stronger than the magnetic retention forces of the magnetic elements 52. Each magnetic element 52 may be removably or fixedly attached to the deformable mount 50. For example, the magnetic elements 52 may be connected to the deformable mounts 50 via an adhesive and/or known fasteners (unnumbered). If the magnetic elements 52 and the deformable mounts 50 are coupled via known fasteners, such as screws or bolts and nuts, then each magnetic element 52 and each deformable mount 50 may include respective mounting holes for receiving the fastener(s). The magnetic elements 52 are shown as having discoidal bodies; however, each magnetic element 52 can have any desired shape and/or cross-section, such rectangular, hexagonal, cylindrical, etc. The magnetic elements 52 may be in the form of any desired magnet, such as temporary magnets and/or permanent magnets, including neodymium, samarium-cobalt, alnico, and/or ceramic magnets.

The bumpers 54 are adjacent to the deformable mount 50 and magnetic element(s) 52. The bumpers 54 are configured for supporting the weight of the outer arm 42. In other words, the bumpers 54 act as rests which allow the weight of a respective outer arm 42 to substantially rest against each bumper 54. Thereby, the bumpers 54 may be substantially equal with or be positioned slightly above or below the top planes of the magnetic elements 52. The bumper 54 can be connected to the first bracket 56 by known fasteners, such as nuts and bolts (unnumbered). The bumper 54 can be in the form of a semi-rigid block which is composed of any suitable material, such as a polymer material, a rubber material, a metal, or a composite. As shown, each retention device 48 includes only one bumper 54; however, each retention device 48 may include more than one bumper 54. The bumper 54 may additionally include one or more fastener receiving hole(s) in order to securely fasten the bumper 54 onto the inner arm 44.

Figure 3:
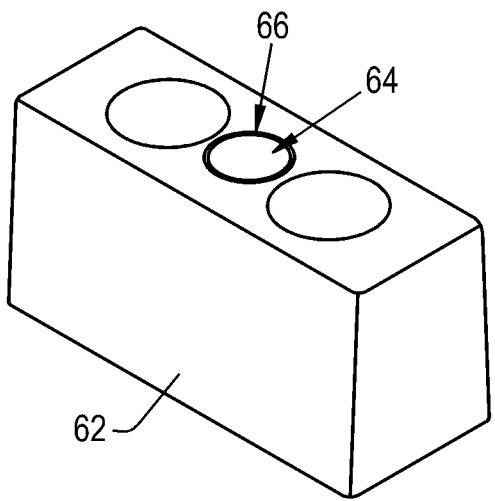
FIG. 3 illustrates another embodiment of a bumper of a retention device, in accordance with an exemplary embodiment of the present invention.

Referring now to FIG. 3, there is shown another embodiment of a bumper 62 which may take the place of the bumper 54 in a retention device 48 as discussed above. The bumper 62 may be substantially similar to the bumper 54, except that the bumper 62 includes one or more magnetic element(s) 64 disposed within one or more corresponding recess(es) 66. As shown, the bumper 62 includes a single magnetic element 64 disposed at the center of the bumper 62 and adjacent to the top surface of the bumper 62. The magnetic element 64 in the present exemplary embodiment of the present invention is shown to be discoidal; however, the magnetic element 64 may be in the form of any desired shape. The bumper 62 may replace the deformable member 50 and the magnetic element 52 combination in each retention device 48 and/or the bumper 62 may act in conjunction with the magnetic element 52 in each retention device 48.

These and other advantages of the present invention will be apparent to those skilled in the art from the foregoing specification. Accordingly, it is to be recognized by those skilled in the art that changes or modifications may be made to the above-described embodiments without departing from the broad inventive concepts of the invention. It is to be understood that this invention is not limited to the particular embodiments described herein, but is intended to include all changes and modifications that are within the scope and spirit of the invention.

What is claimed is:

1. An implement for an agricultural vehicle, comprising:
a toolbar; and
a pair of marking devices pivotally connected to the toolbar, each said marking device including:
at least one arm configured for pivoting between a stored position and an operational position; and
a retention device supported by the toolbar and configured for providing a magnetic retention force which magnetically retains the at least one arm in the stored position,
wherein the at least one arm includes a first arm and a second arm pivotally connected to the first arm such that in the stored position the first and second arms are folded relative to one another and in the operational position the first and second arms are unfolded relative to one another, and the retention device is connected to the second arm, and
wherein the retention device includes a deformable mount and at least one magnetic element mounted to the deformable mount for magnetically retaining each first arm relative to each second arm in the stored position.

2. The implement of claim 1, wherein the respective at least one magnetic elements of the marking devices inhibit a movement of the first arms in the stored position such that the first arms are prevented from unfolding upon being at least one of tilted, jostled, and subjected to a force.

3. The implement of claim 1, wherein the first arm contacts the at least one magnetic element in the stored position, and the deformable mount is configured for dampening an impact of the first arm acting on the at least one magnetic element as the first arm folds into the stored position.

4. The implement of claim 1, wherein the deformable mount is in the form of a flexible rubber belt.

5. The implement of claim 1, wherein the retention device further includes a bumper adjacent to the deformable mount and configured for supporting a weight of the first arm.

6. The implement of claim 5, wherein the retention device further includes a first bracket connected to the second arm and mounting the bumper and a second bracket connected to the first bracket and mounting the deformable mount.

7. The implement of claim 1, wherein in the stored position, the retention device is located in between the second arm and the first arm.

8. A marking device pivotally connected to an implement of an agricultural vehicle, comprising:
a first arm;
a second arm pivotally connected to the first arm, and the first and second arms are configured for pivoting between a stored position in which the first and second arms are folded relative to one another and an operational position in which the first and second arms are unfolded relative to one another; and
a retention device connected to the second arm and configured for retaining the first arm relative to the second arm in the stored position, and
wherein the retention device includes a deformable mount and at least one magnetic element mounted to the deformable mount and configured for providing a magnetic retention force for magnetically retaining the first arm relative to the second arm in the stored position.

9. The marking device of claim 8, wherein the at least one magnetic element is configured for inhibiting a movement of the first arm in the stored position such that the first arm is prevented from unfolding upon being at least one of tilted, jostled, and subjected to a force.

10. The marking device of claim 8, wherein the first arm is configured for contacting the at least one magnetic element in the stored position, and the deformable mount is configured for dampening an impact of the first arm acting on the at least one magnetic element as the first arm folds into the stored position.

11. The marking device of claim 8, wherein the deformable mount is in the form of a flexible rubber belt.

12. The marking device of claim 8, wherein the retention device further includes a bumper adjacent to the deformable mount and configured for supporting a weight of the first arm in the stored position.

13. The marking device of claim 12, wherein the retention device further includes a first bracket connected to the second arm and mounting the bumper and a second bracket connected to the first bracket and mounting the deformable mount.

14. The marking device of claim 8, wherein in the stored position, the retention device is located in between the second arm and the first arm.

\* \* \* \* \*